United States Patent [19]
Kim et al.

[11] Patent Number: 6,086,842
[45] Date of Patent: Jul. 11, 2000

[54] RECYCLING OF SODIUM HYDROXIDE AND PRODUCTION OF GYPSUM FROM DRY FLUE GAS DESULFURIZATION

[75] Inventors: Bang Mo Kim; Norman Zethward Shilling, both of Schenectady, N.Y.

[73] Assignee: General Electric Company, Schenectady, N.Y.

[21] Appl. No.: 08/581,952

[22] Filed: Jan. 2, 1996

[51] Int. Cl.[7] .......................... C01B 17/00; C01B 17/96; C01F 11/46
[52] U.S. Cl. ..................... 423/511; 423/512.1; 423/544; 423/554; 423/555; 423/242.1; 423/243.01; 423/243.08; 423/244.01; 423/244.03
[58] Field of Search ................................ 423/511, 512.1, 423/544, 554, 555, 244.03, 243.11, 242.1, 243.01, 243.08, 244.01; 422/169, 170; 95/135, 137, 901

[56] References Cited

U.S. PATENT DOCUMENTS 4,302,221  11/1981  Tanaka ......................................... 55/60
5,599,508  2/1997  Martinelli et al. ....................... 422/169
5,770,537  6/1998  El-Shoubary et al. ..................... 502/25

FOREIGN PATENT DOCUMENTS 52-123379  10/1977  Japan ..................................... 423/555

*Primary Examiner*—Steven P. Griffin
*Assistant Examiner*—Eileen E. Nave
*Attorney, Agent, or Firm*—Ernest G. Cusick; Noreen C. Johnson

[57] ABSTRACT

The present invention is directed towards a system that makes high quality gypsum from a dry flue gas desulfurization process which utilizes a low temperature regeneration of the carbon adsorbent in the flue gas process. The high quality gypsum is easily filterable with large crystal size and has high purity with few contaminants, such as calcium sulfite and heavy metals. This invention is also directed towards a system that regenerates the carbon used in dry flue gas desulfurization at a temperature below 120° C. and the recycling of sodium hydroxide to form a sodium sulfite reducing solution for carbon adsorbent regeneration.

7 Claims, 6 Drawing Sheets

RECYCLING OF SODIUM HYDROXIDE AND PRODUCTION OF GYPSUM FROM DRY FLUE GAS DESULFURIZATION

This invention is related to copending and commonly assigned U.S. patent applications, LOW-TEMPERATURE METHOD TO REGENERATE CARBON LOADED WITH SULFUR COMPOUNDS, U.S. Pat. No. 5,770,537, and SYSTEM FOR PRODUCING SULFURIC ACID FROM DRY FLUE GAS DESULFURIZATION, U.S. Pat. No. 5,679,238.

FIELD OF THE INVENTION

The invention relates to a system for removal of sulfur dioxide from flue gas using dry carbon adsorbent and producing gypsum. More specifically, the invention relates to a continuous or batch system for removing sulfur dioxide from flue gas, regenerating the carbon adsorbents at low temperature, and producing gypsum from by-products of the low temperature regeneration of the carbon adsorbents used in flue gas desulfurization.

BACKGROUND OF THE INVENTION

Flue gas desulfurization processes, also referred to as FGD, can conveniently be categorized by the manner in which the sulfur compounds removed from the flue gases are eventually produced for disposal.

One category is termed "throwaway process" in which the eventual sulfur product is disposed of as waste. Disposal can include a landfill or pond. The processes in this category involve wet scrubbing of the flue gases for absorption, followed by various methods for neutralizing the acidity, separating the sulfur compounds from the scrubbing liquor, and usually recycling at least part of the scrubbing liquor.

A second category is the gypsum processes, which are designed to produce gypsum of sufficient quality either for use as an alternative to natural gypsum or as a well-defined waste product. As with the throwaway processes, this category involves wet scrubbing for absorption followed by various methods of neutralizing the lime or limestone and recovering the sulfur compound. The sulfur dioxide ($SO_2$) is first absorbed in the solution and then the dissolved sulfur dioxide reacts with lime ($Ca(OH)_2$) or limestone ($CaCO_3$) to produce calcium sulfite ($CaSO_3$). The sulfite species in the slurry are oxidized by oxygen present in the flue gas producing hydrated calcium sulfate ($CaSO_4$ $2H_2O$), herein referred to as gypsum. Since gypsum is more desirable than calcium sulfite, additional oxidation is carried out to completely convert calcium sulfite to gypsum, which is an additional oxidation step, also called forced oxidation process.

The major drawbacks of the wet flue gas desulfurization process are scaling and plugging in the absorber; reheating is required for stack gas buoyancy; difficulty is experienced in growing gypsum crystals for efficient solid/liquid separation; and there is minimal removal of nitrogen oxides ($NO_x$).

Dry flue gas desulfurization involves sorption of sulfur dioxide in solids, such as lime, metal oxides, and activated carbon. Dry sorption processes take place at higher temperatures than wet processes. Generally, regeneration processes for carbon adsorbents occur at elevated temperatures above 120° C., and particularly, above about 400° C. As the temperature increases during the regeneration process, the acid reacts with the carbon and forms carbon dioxide. In addition, the carbon will reduce $SO_3$ to $SO_2$. This reaction produces carbon monoxide and carbon dioxide. These reactions cause carbon loss that consequently affect the process economics and effectiveness of the carbon adsorbent.

There is a need for a system that uses low temperatures to regenerate carbon adsorbents while reducing carbon loss that produces gypsum from the regeneration by-products. There is also a need for a dry low temperature process to regenerate carbon used in flue gas desulfurization that produces gypsum while eliminating a forced oxidation step. Also, there is a need for a cost effective system to produce gypsum from a dry low temperature flue gas desulfurization process that produces environmentally safe products and provides easy operation.

SUMMARY OF THE INVENTION

This invention satisfies these needs by providing a system to produce gypsum from dry flue gas desulfurization comprising the steps of: adsorbing sulfur dioxide from a flue gas stream in a dry activated carbon adsorbent; regenerating the carbon adsorbent contaminated with sulfur or sulfur-containing compounds by washing the carbon adsorbent with a sufficient amount of a basic reducing solution consisting essentially of sodium sulfite and water having a pH above 7.0 at a temperature below 120° C. for a sufficient amount of time to reduce $SO_3$ to a $SO_2$ byproduct and produce sodium sulfate in the solution; adding a sufficient amount of calcium hydroxide to the sodium sulfate solution to form a slurry consisting essentially of hydrated calcium sulfate, sodium hydroxide, and water; and filtering the hydrated calcium sulfate from the slurry. A sufficient amount of a basic reducing solution is an amount necessary to reduce $SO_3$ to $SO_2$ in the carbon adsorbent. Likewise, a sufficient amount of calcium hydroxide is an amount necessary to react with the sodium sulfate to form hydrated calcium sulfate and sodium hydroxide. The hydrated calcium sulfate, also herein referred to as gypsum, is present as solid crystals which may be suspended in the slurry or settled at the bottom of the vessel. The sodium hydroxide is dissolved in the water in the slurry.

This invention also encompasses a method of recycling sodium hydroxide from a slurry consisting essentially of gypsum, sodium hydroxide, and water that is formed from reacting $SO_2$ by-products from low temperature carbon regeneration from dry flue gas desulfurization, which comprises the steps of: filtering gypsum from the slurry to produce a sodium hydroxide solution; and reacting the sodium hydroxide solution with a $SO_2$ by-product from regeneration of a carbon adsorbent to produce a sodium sulfite reducing solution.

An advantage of this invention is the use of low temperatures below 120° C. at which the regeneration reactions take place. The low temperature capability provides energy cost savings as well as increased safety precautions by reducing the risk of fire that is posed by high temperature carbon regeneration processes. A further advantage of this invention is that the carbon adsorbent has a longer life due to little or no loss of carbon from the regeneration reactions. The carbon does not enter into the reactions of the sulfur or sulfur-containing species removal from the adsorbent. Still another advantage of this invention is the elimination of the forced oxidation step in the production of gypsum. Yet another advantage is the recycling of sodium hydroxide to form the sodium sulfite reducing solution that is used to regenerate the carbon adsorbent used in dry flue gas desulfurization.

DESCRIPTION OF THE INVENTION

The present invention is directed towards a system that makes high quality gypsum from a dry flue gas desulfurization process which utilizes a low temperature regeneration of the carbon adsorbent in the flue gas process. The high quality gypsum is easily filterable with large crystal size and has high purity with few contaminants, such as calcium sulfite and heavy metals. This invention is also directed towards a system that regenerates the carbon used in dry flue gas desulfurization at a temperature below 120° C. Temperatures below 120° C. are herein referred to as low-temperature methods of carbon regeneration. Preferably, the temperature is room temperature. However, higher temperatures up to 120° C. may be utilized to speed the rate of the reaction without causing carbon loss.

The carbon regeneration step of this invention involves washing or soaking the carbon adsorbent that is used in the dry flue gas desulfurization in a basic reducing solution consisting essentially of sodium sulfite and water. The reducing solution has a pH from above 7.0 to about 12.0, and the preferred range is about 8.0 to 10.0. The reducing solution is made by admixing sodium sulfite with an aqueous medium, such as water, to obtain a solution which needs to have a pH greater than 7.0. A base, such as sodium hydroxide, may be used to adjust the reducing solution to above 7.0.

The reducing solution reduces $SO_3$ to $SO_2$ to prevent carbon loss. The basic solution neutralizes the sulfuric acid in the carbon pores thereby preventing any further carbon loss. Sodium sulfite can be used for long times in a cyclic reaction since it is the product that is produced from the reaction of sodium hydroxide with $SO_2$. The sodium hydroxide is formed in the slurry with the gypsum, and is then recycled to form the sodium sulfite. Using sodium sulfite ($Na_2SO_3$) and water ($H_2O$) as the reducing solution, the following reactions demonstrate the invention at room temperature.

1. $SO_2 + 2NaOH \rightarrow Na_2SO_3 + H_2O$
2. $SO_3 + Na_2SO_3 \rightarrow Na_2SO_4 + SO_2$
3. $Na_2SO_4 + Ca(OH)_2 + 2H_2O \rightarrow CaSO_4\ 2H_2O + 2NaOH$

EXAMPLES

Example 1

Figure 1:
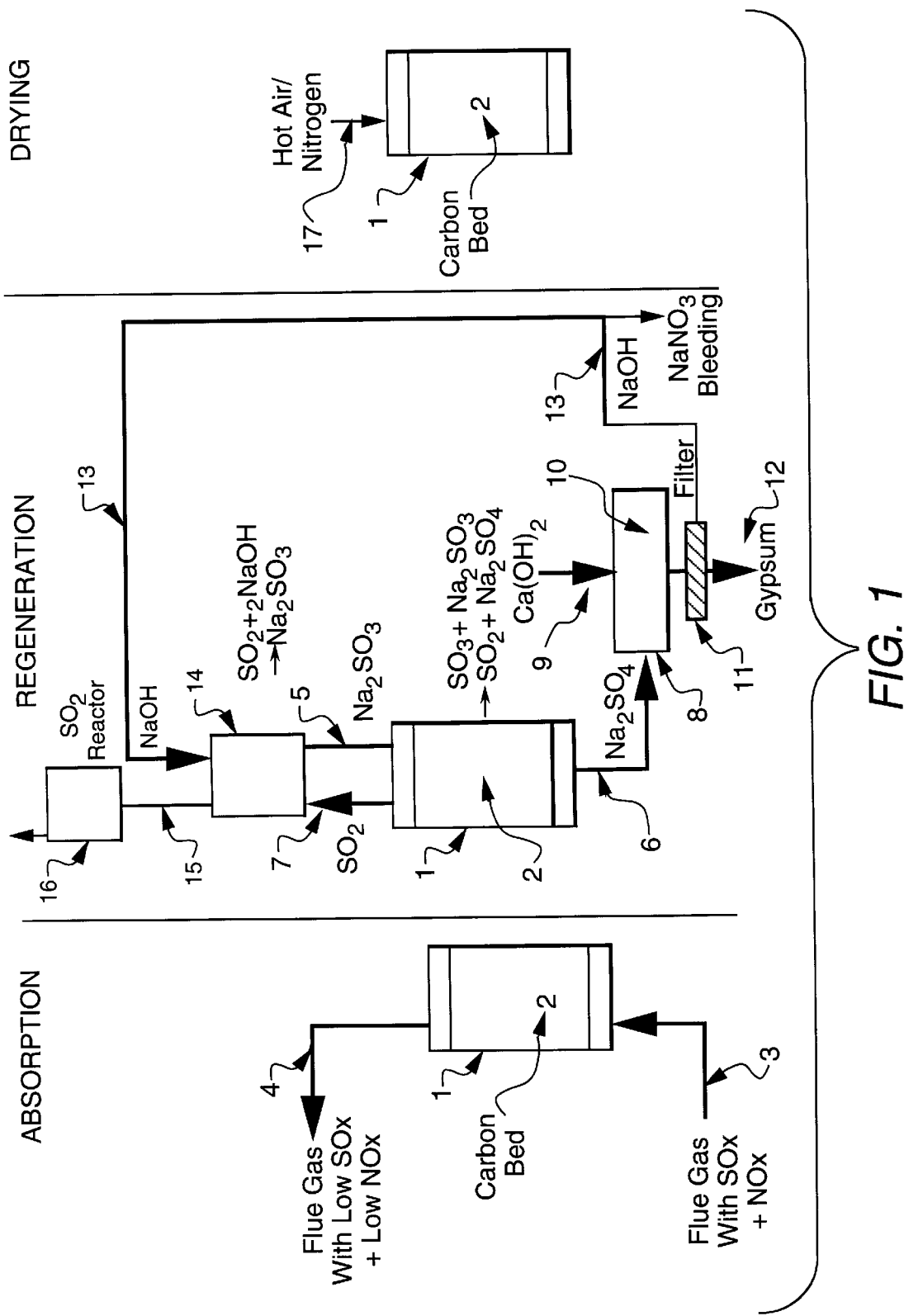
FIG. 1 is a diagram of a batch operation of a dry flue gas desulfurization process for the production of gypsum and recycling of sodium hydroxide.

To demonstrate the invention for producing gypsum from dry flue gas desulfurization technology using low temperature carbon adsorbent regeneration, now turning to FIG. 1, there is shown one embodiment of the invention for batch operation. By batch operation is meant that system is confined to a single vessel for sulfur adsorption and carbon regeneration. In the first step of the system, coming from the boiler the flue gas 3 enters the adsorber vessel 1 where the gas is brought into contact with the dry activated carbon adsorbent 2. The sulfur dioxide is sorbed into the dry carbon. The desulfurized flue gas 4 passes to the stack directly. The next step of the system is the regeneration of the carbon adsorbent. In the batch process, this step is also done in the adsorber vessel 1. During regeneration of the carbon 2, the carbon adsorbent 2 loaded with sulfur and sulfur-containing compounds is washed or soaked with a basic reducing solution 5 consisting essentially of sodium sulfite and water. The reducing solution 5 has a pH above 7.0. Byproducts from washing the carbon adsorbent, sodium sulfate 6 and gaseous sulfur dioxide 7 are removed from the vessel 1. The sodium sulfate solution 6 enters a reactor vessel 8 and is admixed with a sufficient amount of calcium hydroxide 9 to form a slurry 10 consisting essentially of solid gypsum (hydrated calcium sulfate), and sodium hydroxide dissolved in water. The slurry 10 is then filtered 11 to separate gypsum 12 from the sodium hydroxide solution 13. The sodium hydroxide solution 13 is then further recycled to a reducing solution vessel 14. In the reducing solution vessel 14 the sodium hydroxide solution 13 is reacted with the sulfur dioxide 7 to form sodium sulfite 5. From the reducing solution vessel 14, unreacted sulfur dioxide 15, enters a sulfur dioxide scrubber 16. After the completion of the regeneration of the carbon adsorbent, the carbon is dried in the adsorber vessel 1 with hot air or nitrogen 17.

Example 2

Figure 2:
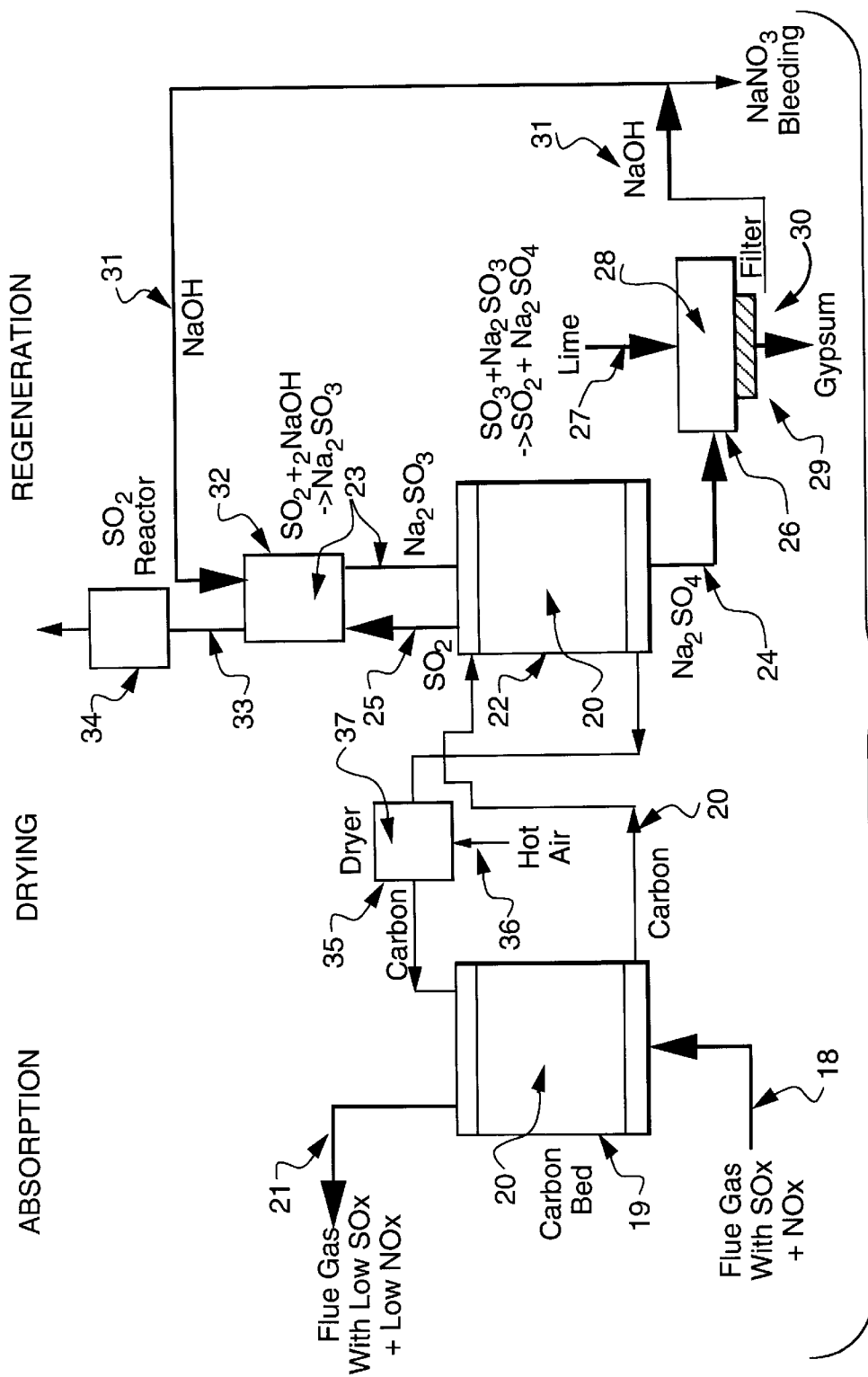
FIG. 2 is a diagram of a continuous operation of a dry flue gas desulfurization process for the production of gypsum and recycling of sodium hydroxide.
Figure 3:
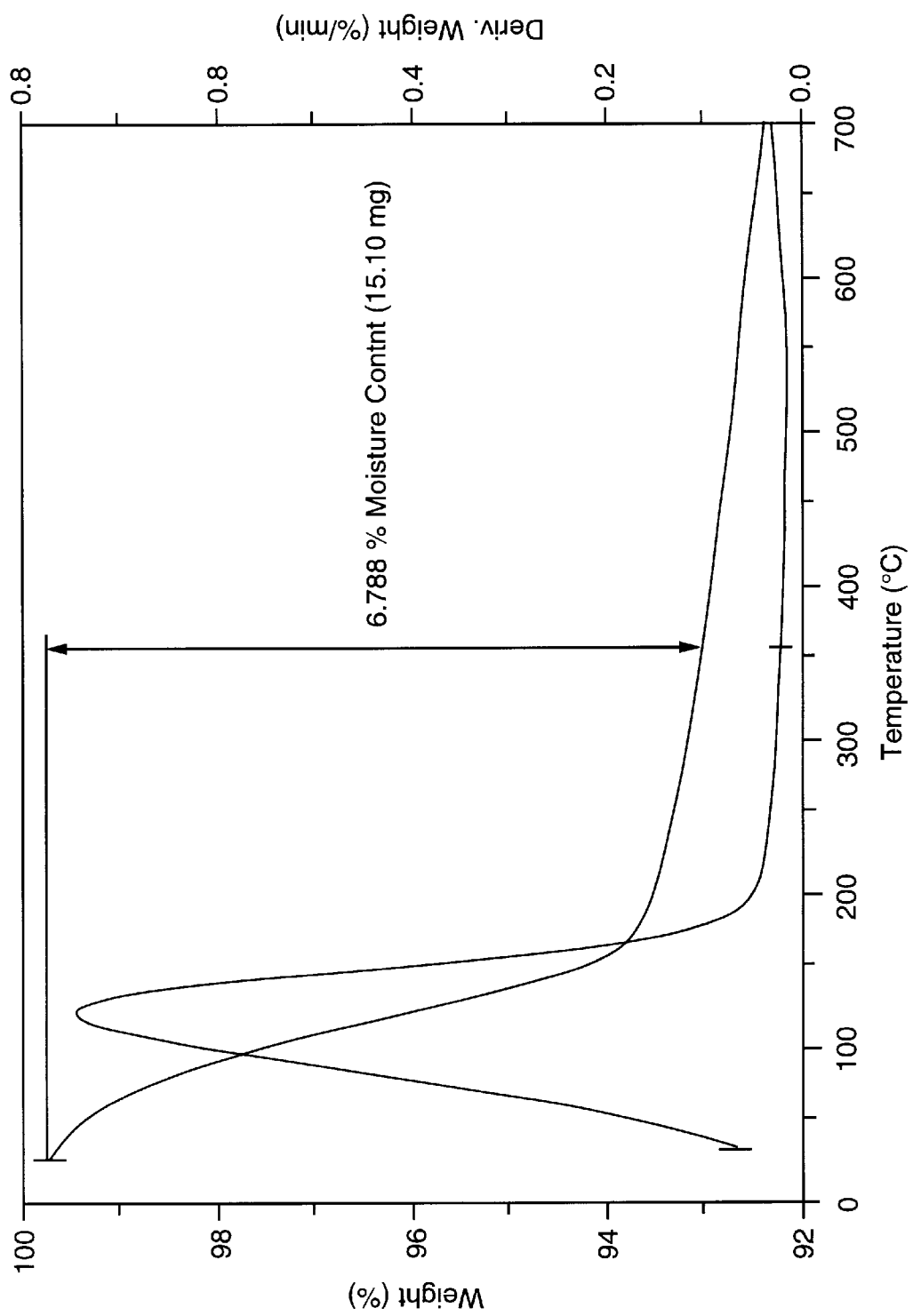
FIG. 3 is a thermogram of clean carbon that is used as a baseline.
Figure 4:
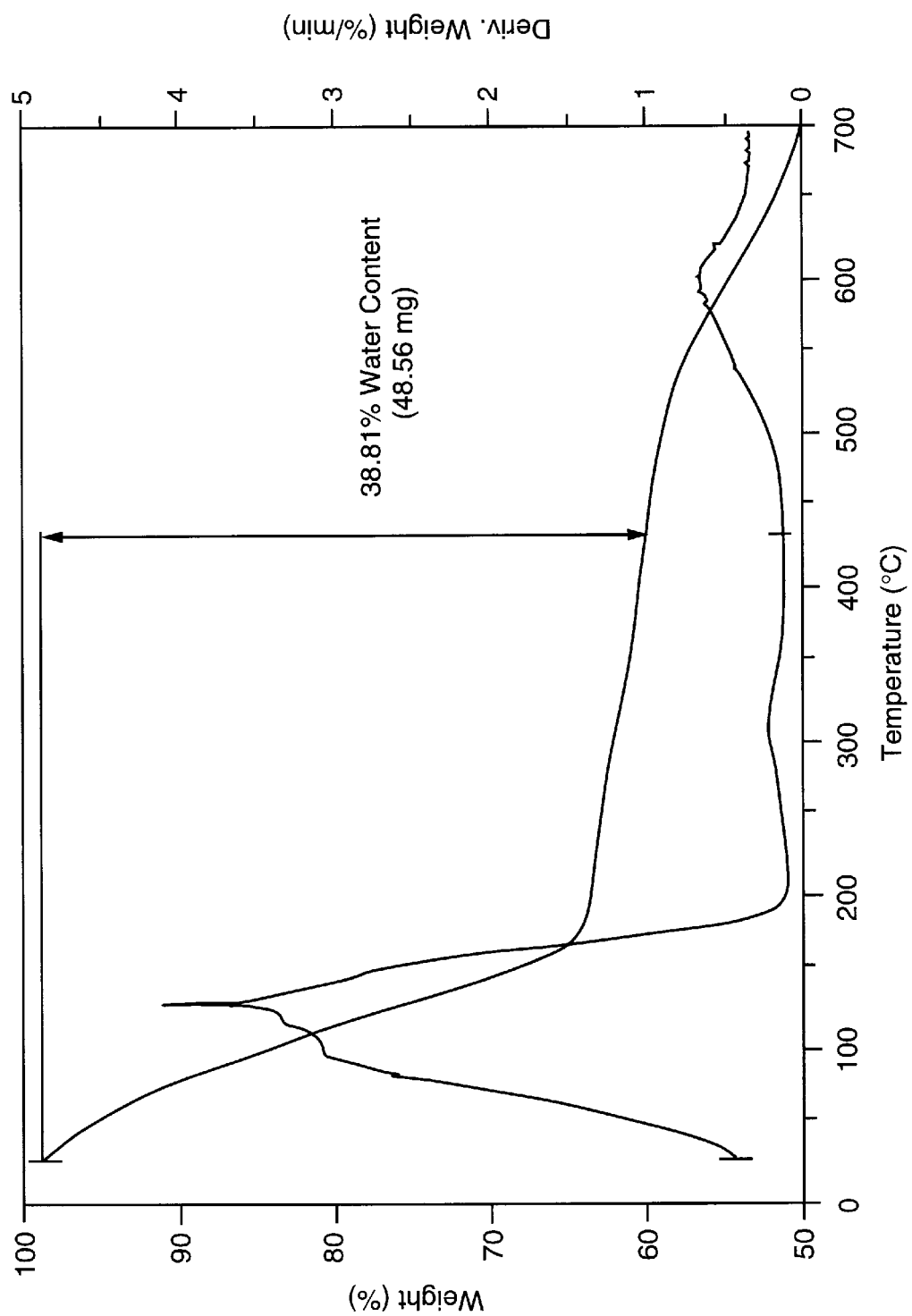
FIG. 4 is a thermogram of contaminated carbon after soaking in a sodium sulfite reducing solution for fifteen minutes.
Figure 5:
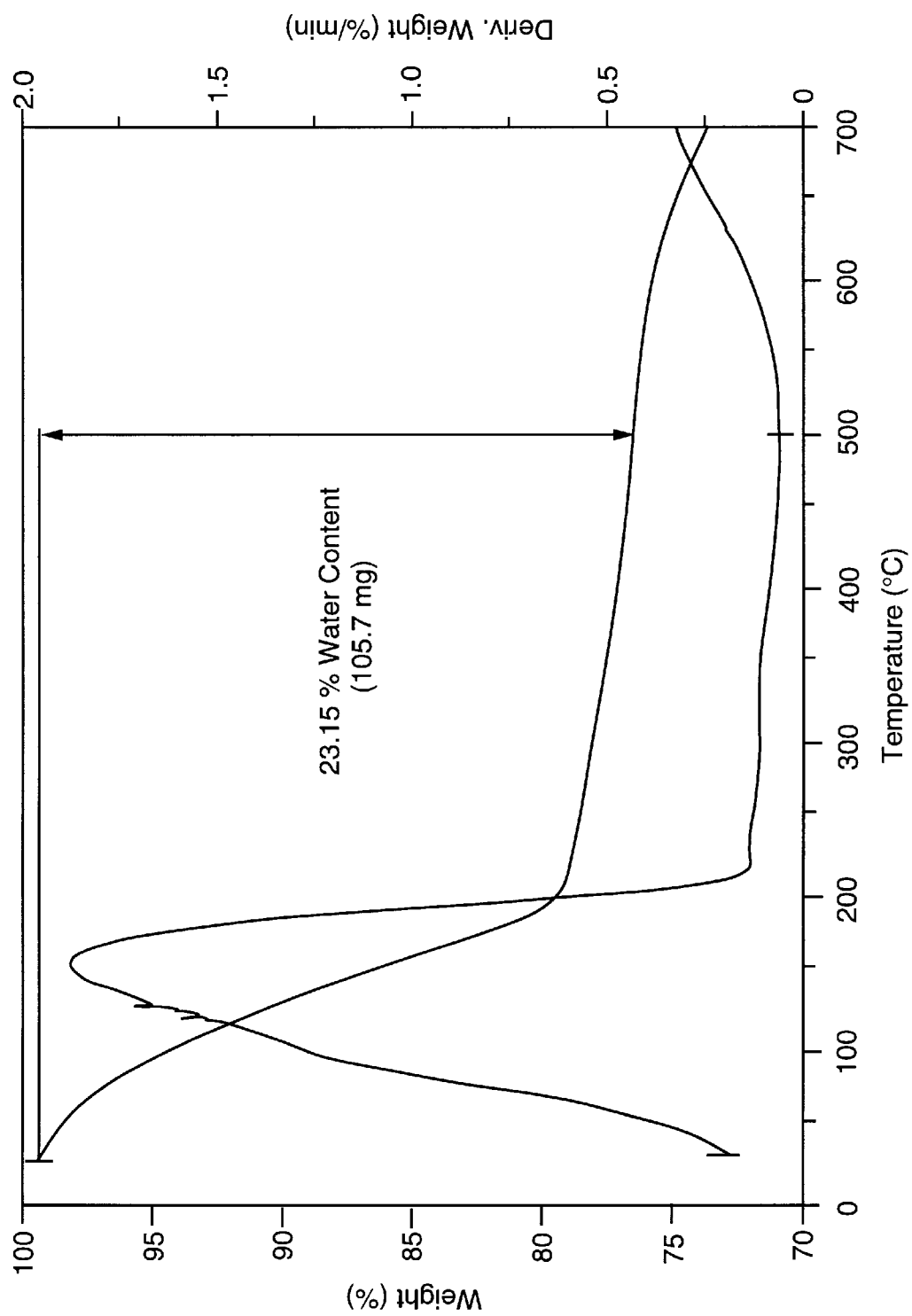
FIG. 5 is a thermogram of contaminated carbon after soaking in a sodium sulfite reducing solution for twenty minutes.
Figure 6:
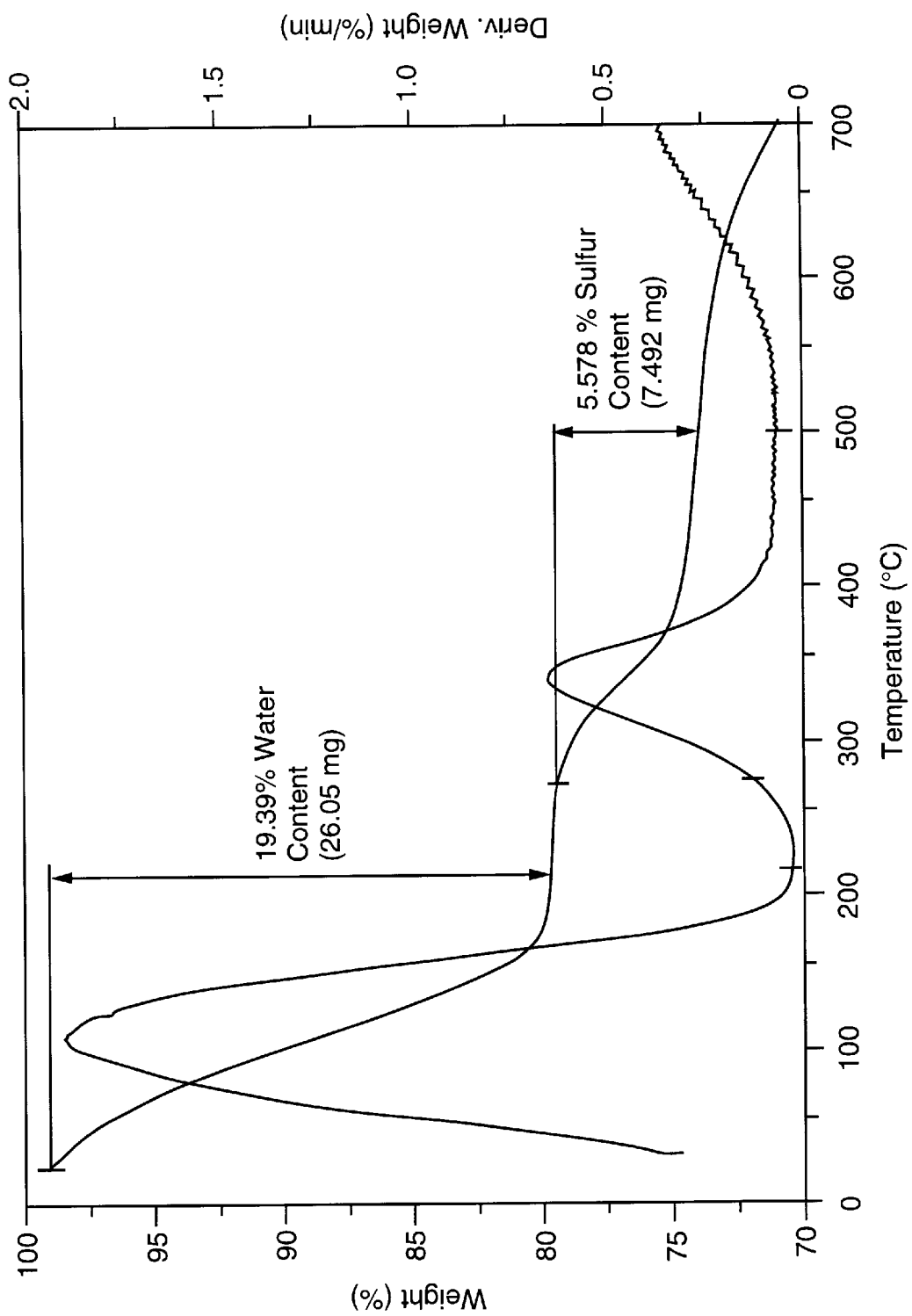
FIG. 6 is a thermogram of contaminated carbon after soaking in water for twelve hours.

In a second embodiment of the invention, now turning to FIG. 2, there is shown a continuous system for gypsum production from dry flue gas desulfurization using low temperature carbon adsorbent regeneration. In the first step of the system, coming from the boiler the flue gas 18 enters the adsorber vessel 19 where the gas is brought into contact with the activated dry carbon adsorbent 20. The sulfur dioxide is sorbed into the dry carbon. The desulfurized flue gas 21 passes to the stack directly. The next step of the system is done in a carbon regenerator vessel 22, where the carbon adsorbent is regenerated at low temperatures using a basic reducing solution 23. The spent carbon adsorbent 20 is removed from the adsorber vessel 19 and is placed in the regenerator vessel 22. This may by done by a moving carbon bed. During regeneration of the carbon 20, the carbon adsorbent 20 loaded with sulfur and sulfur-containing compounds is washed or soaked with a basic reducing solution 23 consisting essentially of sodium sulfite and water. The reducing solution 23 has a pH above 7.0. By-products from washing the carbon adsorbent 20, sodium sulfate 24 and gaseous sulfur dioxide 25 are removed from the vessel 22. The sodium sulfate solution 24 enters a reactor vessel 26 and is reacted with a sufficient amount of calcium hydroxide 27 to form a slurry 28 consisting essentially of solid gypsum (hydrated calcium sulfate), and sodium hydroxide dissolved in water. The slurry 28 is then filtered 29 to separate gypsum 30 from the sodium hydroxide solution 31. The sodium hydroxide solution 31 is then further recycled to a reducing solution vessel 32. In the reducing solution vessel 32 the sodium hydroxide solution 31 is reacted with the sulfur dioxide 25 to form sodium sulfite reducing solution 23. From the reducing solution vessel 32, unreacted sulfur dioxide 33, enters a sulfur dioxide scrubber 34. After the completion of the regeneration of the carbon adsorbent 20, the regenerated carbon is removed from the regenerator vessel 22 and dried in the drier vessel 35 with hot air or nitrogen 36. The regenerated carbon is then placed in the adsorber vessel 19 for use in dry flue gas desulfurization.

Example 3

To test the use of the basic reducing solution on carbon adsorbents utilized in flue gas desulfurization technology, a thermogravimetric analyzer (TGA) was used to obtain thermograms of clean and contaminated carbon. The carbon loading of sulfur contaminants was found to be about sixteen weight percent. The contaminated carbon was soaked at room temperature in aqueous solutions of sodium sulfite having a pH of 9.5 and water alone. The soaked carbon adsorbent was then run in the thermogravimetric analyzer. The produced thermograms showed that the carbon which was soaked in water took longer to regenerate the carbon then reducing solutions of sodium sulfite. The water took approximately three days to regenerate the carbon adsorbent. However, in the use of sodium sulfite solutions, regenerated carbon was obtained in less than seven minutes. FIGS. 3–6 give the thermograms for clean carbon; carbon soaked in sodium sulfite for fifteen minutes; carbon soaked in sodium sulfite for seven minutes; and carbon soaked in water alone for twelve hours, respectively.

What is claimed:

1. A process for making gypsum from flue gas containing sulfur dioxide, the process comprising:

removing sulfur dioxide from the flue gas by adsorption on a dry activated carbon;

contacting the sulfur dioxide containing carbon With an aqueous solution of sodium sulfite and sodium hydroxide at a temperature below 120° C. and a pH above 7.0 to produce an aqueous solution of sodium sulfate;

admixing the solution of sodium sulfate with calcium hydroxide to form a slurry comprising water, gypsum, and sodium hydroxide, and recovering gypsum from the slurry by filtration;

separating activated carbon from the aqueous solution; and drying the activated carbon after the step of removing sulfur dioxide from the flue gas by adsorption, wherein the step of drying comprises drying the activated carbon by at least one of hot air or nitrogen;

the method further comprises placing dry activated carbon in an adsorber vessel after the step of drying the activated carbon by at least one of hot air or nitrogen, wherein the dry activated carbon in the adsorber vessel is capable of use in the step of removing sulfur dioxide from the flue gas by adsorption on a dry activated carbon.

2. A method according to claim 1, wherein the step of recovering gypsum comprises filtering the slurry to recover a generally pure gypsum.

3. A system according to claim 1 where the system is continuous or batch system.

4. A system according to claim 1 where the pH of the reducing solution is between about 8.0 to 10.0.

5. A system according to claim 1 where the temperature below 120° C. to soak the carbon adsorbent is room temperature.

6. A system according to claim 1 where the time to soak the carbon adsorbent with sodium sulfite reducing solution at room temperature is about fifteen minutes.

7. A method of recycling sodium hydroxide from a slurry consisting essentially of gypsum, sodium hydroxide, and water that is formed from reacting $SO_2$ by-products from low temperature carbon regeneration from dry flue gas desulfurization, which comprises the steps of: filtering gypsum from the slurry to produce a sodium hydroxide solution; and reacting the sodium hydroxide solution with a $SO_2$ by-product from low temperature regeneration of a carbon adsorbent to produce a sodium sulfite reducing solution.

* * * * *